United States Patent
Rahmanian

(10) Patent No.: US 10,048,043 B2
(45) Date of Patent: Aug. 14, 2018

(54) TARGET CARRIER WITH VIRTUAL TARGETS

(71) Applicant: Paul Rahmanian, Aliso Viejo, CA (US)

(72) Inventor: Paul Rahmanian, Aliso Viejo, CA (US)

(*) Notice: Subject to any disclaimer, the term of this patent is extended or adjusted under 35 U.S.C. 154(b) by 216 days.

(21) Appl. No.: 15/207,942

(22) Filed: Jul. 12, 2016

(65) Prior Publication Data

US 2018/0017362 A1 Jan. 18, 2018

(51) Int. Cl.
| | |
|---|---|
| *A63F 9/24* | (2006.01) |
| *F41J 2/00* | (2006.01) |
| *H04N 9/31* | (2006.01) |
| *F41J 9/14* | (2006.01) |
| *F41J 11/00* | (2009.01) |

(52) U.S. Cl.
CPC . *F41J 2/00* (2013.01); *F41J 9/14* (2013.01); *F41J 11/00* (2013.01); *H04N 9/3141* (2013.01); *H04N 9/3179* (2013.01)

(58) Field of Classification Search
None
See application file for complete search history.

(56) References Cited

U.S. PATENT DOCUMENTS

| | | | |
|---|---|---|---|
| 2,409,606 A | 10/1946 | Leverenz | |
| 2,645,721 A | 7/1953 | Williams | |
| 2,665,133 A | 1/1954 | Navarro | |
| 2,683,832 A | 7/1954 | Edwards | |
| 2,843,773 A | 7/1958 | Wardley | |
| 3,502,402 A * | 3/1970 | Markson | G03B 37/00 352/69 |
| 3,601,575 A | 8/1971 | Meyer | |
| 3,802,098 A * | 4/1974 | Sampson | F41G 3/26 273/376 |
| 3,849,910 A | 11/1974 | Greenly | |
| 3,858,884 A | 1/1975 | Cassagnes | |
| 3,889,396 A * | 6/1975 | Aronson | F41G 3/2627 434/20 |

(Continued)

FOREIGN PATENT DOCUMENTS

| | | |
|---|---|---|
| DE | 2360094 A1 | 6/1975 |
| DE | 2740644 A1 | 3/1979 |

(Continued)

*Primary Examiner* — Paul A D'Agostino
(74) *Attorney, Agent, or Firm* — Eric Kelly

(57) ABSTRACT

Various embodiments of systems for improving shooting performance, as well as, carriers configured for that purpose, are disclosed and described herein. In some such embodiments, such systems may comprise: at least one projector, at least one screen, at least one carrier, and at least one pathway. The at least one projector may project one or more images upon at least some portion of the at least one screen. The at least one screen may receive and display the one or more images. The at least one carrier may house the at least one projector; and in some embodiments, may also house at least one screen mount for removably mounting the at least one screen. The at least one carrier may travel along the at least one pathway. A shooter may aim and shoot a firearm at the one or more images displayed upon the at least one screen.

20 Claims, 9 Drawing Sheets

(56) References Cited

U.S. PATENT DOCUMENTS

| | | | |
|---|---|---|---|
| 3,960,380 A * | 6/1976 | Yokoi | F41J 5/10 434/20 |
| 3,990,704 A | 11/1976 | Meyer | |
| 4,175,747 A | 11/1979 | Hudson | |
| 4,175,748 A | 11/1979 | Yokoi | |
| 4,183,534 A | 1/1980 | Simpson | |
| 4,229,009 A | 10/1980 | Ohta | |
| 4,280,694 A | 7/1981 | Trickel | |
| 5,194,006 A | 3/1993 | Zaenglein | |
| 5,194,008 A * | 3/1993 | Mohan | F41G 3/2638 348/121 |
| 5,328,190 A * | 7/1994 | Dart | A63F 9/0291 273/358 |
| 5,366,229 A * | 11/1994 | Suzuki | A63F 13/04 434/20 |
| 5,382,026 A * | 1/1995 | Harvard | A63F 9/0291 463/30 |
| 5,419,260 A | 5/1995 | Hamilton | |
| 5,538,254 A | 7/1996 | Adams | |
| 5,577,733 A | 11/1996 | Downing | |
| 5,676,189 A | 10/1997 | Zeeb | |
| 5,690,492 A | 11/1997 | Herald | |
| 5,823,779 A | 10/1998 | Muehle | |
| 5,973,315 A | 10/1999 | Saldana | |
| 5,980,254 A | 11/1999 | Muehle | |
| 5,999,210 A | 12/1999 | Nemiroff | |
| 6,198,501 B1 | 3/2001 | Nemiroff | |
| 6,328,651 B1 | 12/2001 | Lebensfeld | |
| 6,379,249 B1 * | 4/2002 | Satsukawa | A63F 13/04 273/148 B |
| 6,616,452 B2 | 9/2003 | Clark | |
| 6,840,772 B1 | 1/2005 | Pura | |
| 6,966,775 B1 * | 11/2005 | Kendir | F41A 33/02 434/19 |
| 8,620,464 B1 | 12/2013 | Weiland | |
| 2003/0032478 A1 * | 2/2003 | Takahama | A63F 13/04 463/51 |
| 2003/0199325 A1 * | 10/2003 | Wang | A63F 9/0291 463/51 |
| 2008/0007400 A1 * | 1/2008 | Murphy | G03B 21/00 340/540 |
| 2008/0220397 A1 * | 9/2008 | Capone | F41J 9/14 434/20 |
| 2010/0009734 A1 * | 1/2010 | Sambongi | A63F 13/10 463/5 |
| 2010/0069152 A1 * | 3/2010 | Nishimura | A63F 13/10 463/31 |
| 2012/0208639 A1 * | 8/2012 | Reynolds | G06F 3/0488 463/36 |
| 2013/0199405 A1 | 8/2013 | Rangarajan | |
| 2013/0328927 A1 * | 12/2013 | Mount | G06T 19/006 345/633 |
| 2014/0106311 A1 * | 4/2014 | Skrepetos | F41J 5/10 434/16 |
| 2015/0190726 A1 * | 7/2015 | Frolov | A63F 13/837 472/61 |

FOREIGN PATENT DOCUMENTS

| | | |
|---|---|---|
| EP | 0018673 A1 | 11/1980 |
| EP | 0330886 A1 | 9/1989 |

* cited by examiner

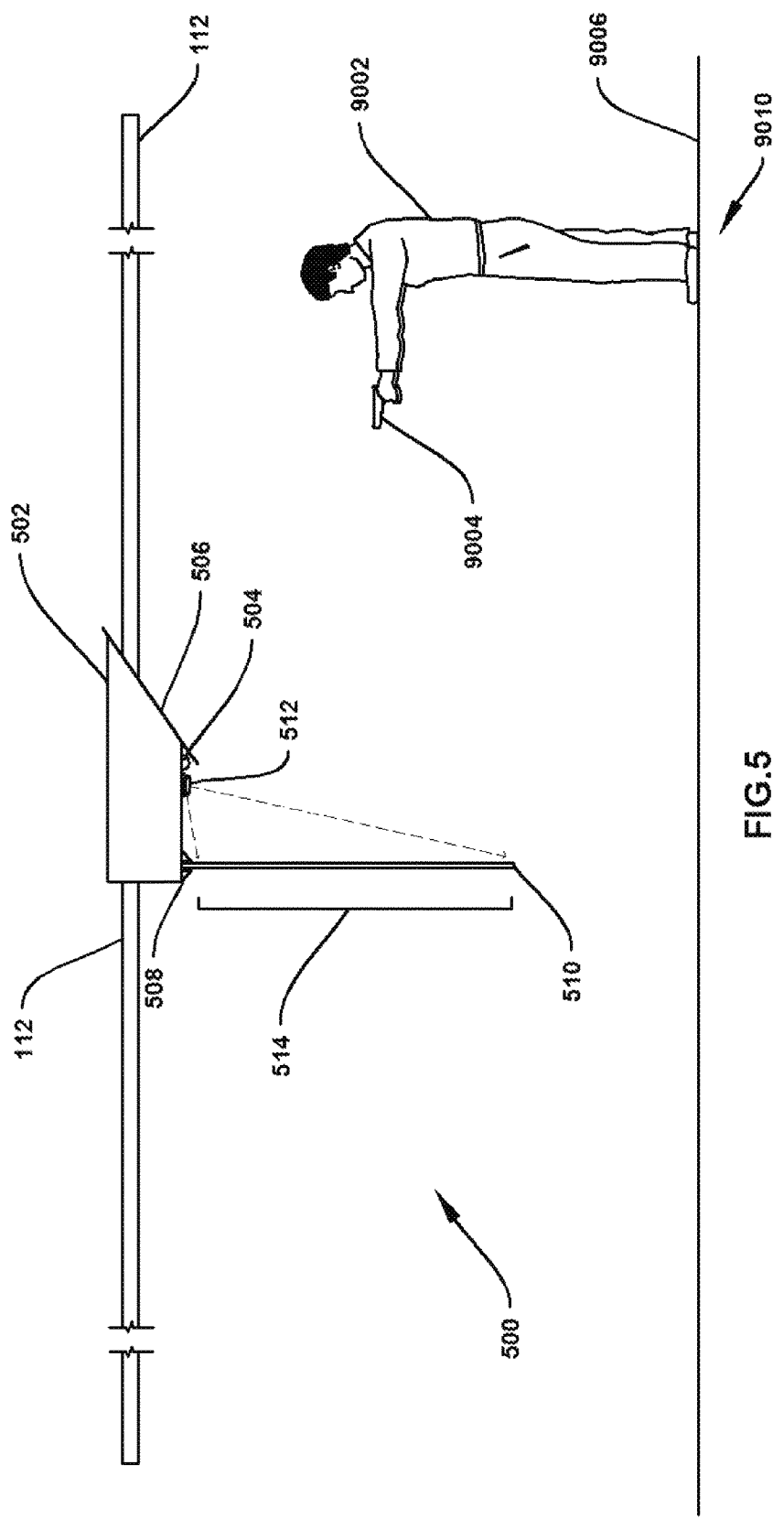

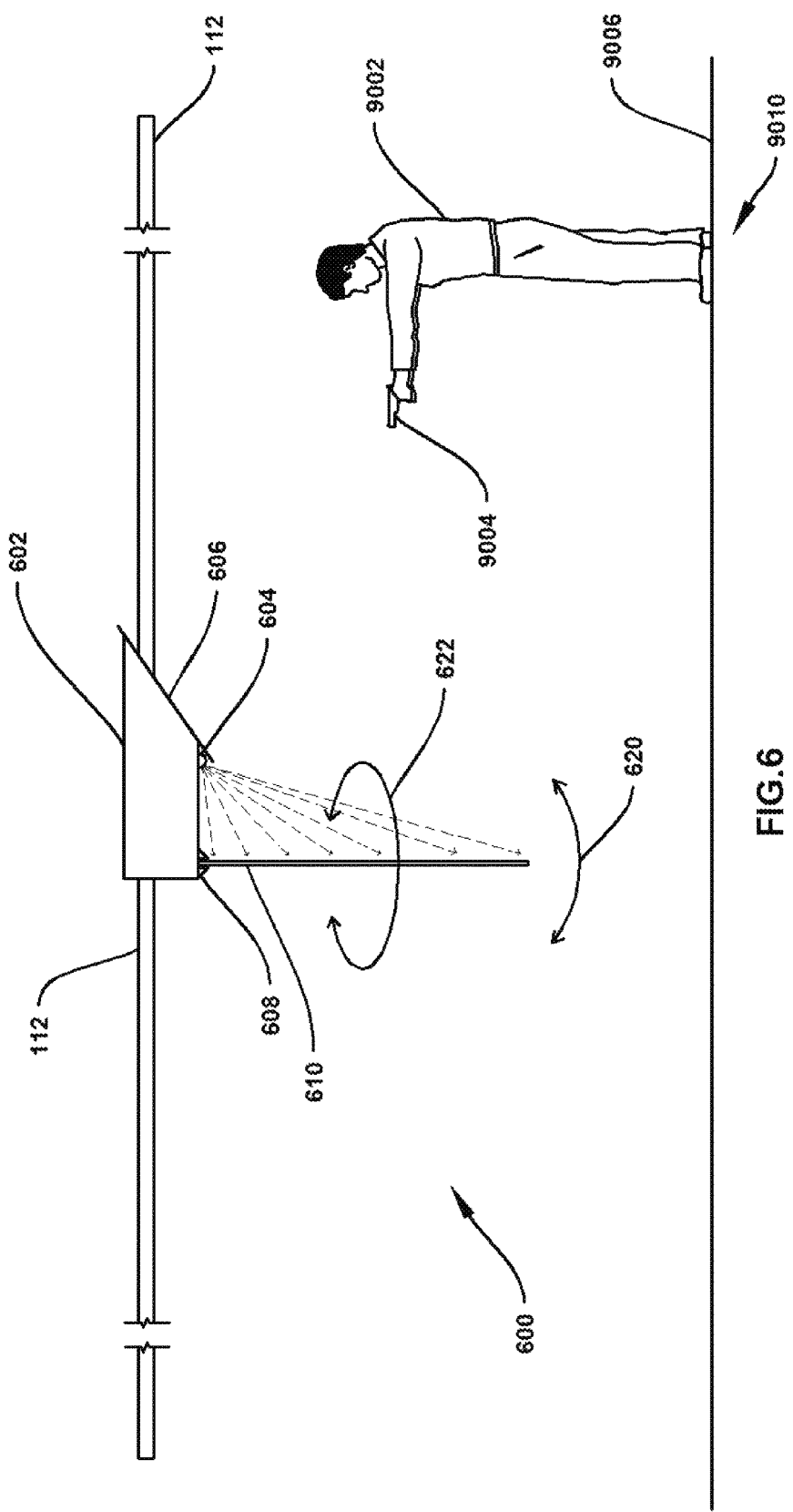

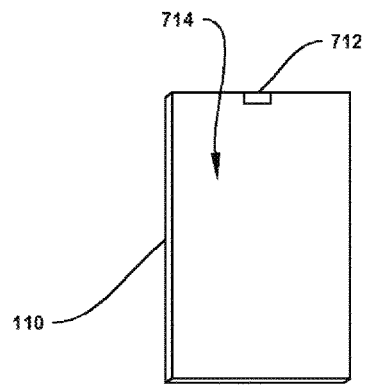
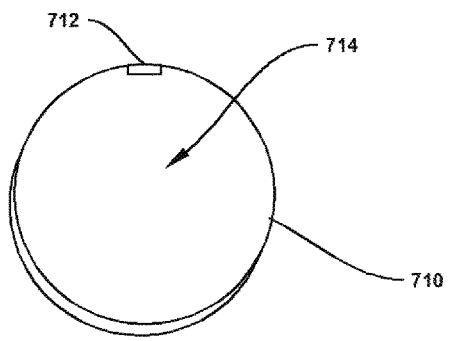
FIG.7A
FIG.7B
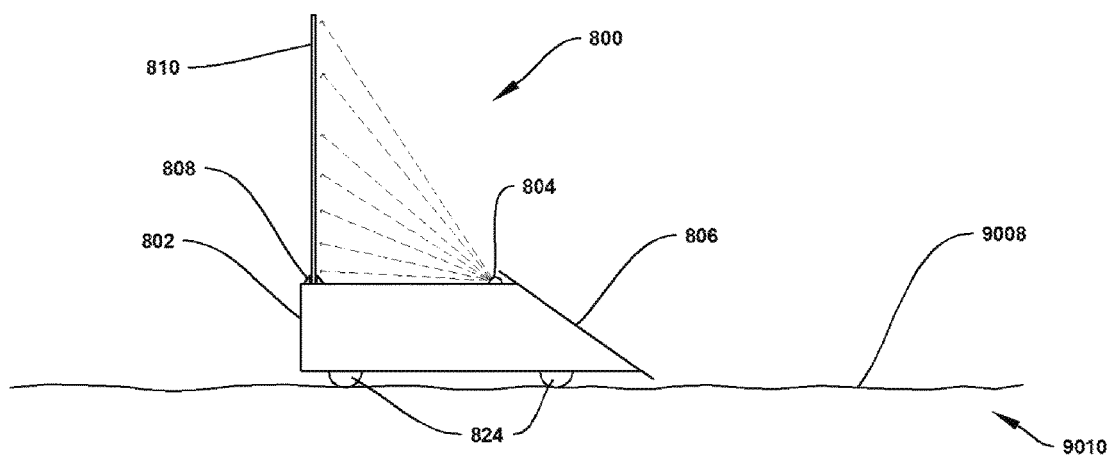
FIG.8

TARGET CARRIER WITH VIRTUAL TARGETS

TECHNICAL FIELD OF THE INVENTION

The present invention relates in general to targets, shooting targetry systems and more specifically to shooting systems that may utilize movable carriers of target screens and/or of projectors.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Proper training and use of firearms for any shooter is necessary. Sports and recreational shooting enthusiasts, competitive shooters, hunters, police, law enforcement, security personnel, bodyguards, the military, and para-military all rely on various targetry systems to perfect their technique, accuracy, reaction times, as well as to practice handling and safe usage of their firearms.

Some targetry systems found in the prior art comprise complex and advanced systems. Some targetry systems found in the prior art require large amounts of space, infrastructure and/or machinery. Some targetry systems found in the prior art are very expensive. Some targetry systems found in the prior art are relatively small. Some targetry systems found in the prior art utilize simulated firearms such as light guns.

Several systems use a plurality of sensors that detect firearm accuracy and range through photoelectric, photodetection, ultrasonic sensors, laser transmitters, or infrared technology. Some use these technologies for advanced training purposes, such as avoiding return fire. Others use these technologies, in combination with computers, for computer-generated response automatic aiming to facilitate high accuracy while attached to a moving vehicle, aircraft, or warship.

Many targetry systems also employ projectors and large, stationary screens to simulate various scenarios in which a firearm might be used. More advanced systems use cameras in combination with projectors for shot detection and to implement a scoring system through which a user can measure improvements in their skill.

At a more basic level, some of the prior art teaches of systems often referred to as "rail systems" or "target retrievers." These comprise "trolleys" that move a target—typically a pre-printed cardboard screen—towards and away from the shooter to practice shooting at different distances and different such targets. The trolley most often moves along a rail or a track, and can also be attached to a cable-pulley system. Sometimes, the trolleys employ an internal motor which rotates the target cardboard, so as to present either "shoot" or "no-shoot" targets.

Such pre-printed targets suffer from a number of problems. First such pre-printed targets at most can only provide two images, as such targets only have two major surfaces. Thus such targets are very limited in their capacity of the types of images that may be associated with a given target. Second, as color(s) are added to the pre-printed image, cost goes up associated with manufacturing such pre-printed targets. Similarly, the greater the image clarity requires greater printing costs as well as more costly source material that will not bleed newly printed images, which also adds to manufacturing costs. Third, use of such pre-printed targets, requires more frequent target replacement, as a shooter may be bored of a given target, and this increases the wear and tear upon the carrier of the targets which gets deployed and retracted more frequently. It would be desirable to instead project target images upon a target screen, wherein such projected images may be static and/or dynamic, and which may change in a variety of ways. More realistic and higher resolution target images may be achieved with projectors and screens as compared to pre-printed targets, with much great cost savings. Use of projectors with screens may also provide targets that may react to strikes, in way that pre-printed targets can never replicate.

Further, use of projectors with screens may eliminate the mechanically more complex present system of turning targets in order to present "shoot" or "no-shoot" targets to the shooter. Additionally, use of such projectors with screens may provide for faster switching "shoot" or "no-shoot" targets which may then provide for improving shooter reaction times.

The prior art also does not provide for at least a one to one correspondence between at least one camera per a given target. By incorporating at least one camera per a given target, each shooter may improve their accuracy, performance, and/or strikes, without having to frequently retract and deploy a target to see such results. Likewise, by incorporating at least one camera per a given target, each shooter may better their accuracy, performance, and/or strikes, without having to frequently use an independent observing tool, like binoculars, to see their results. And third party observers, such as instructors and/or judges may also benefit from use of such camera-to-target pairings.

The prior art also fails to teach use of movable projectors coupled with movable screens. Rather in the prior art, the projectors are generally fixed; and/or both the projector and the screen are fixed. If a given projector does not track in movement along with a given movable screen, then that projector's ability to project quality images becomes severely limited (e.g., limited in the focus and/or color brightness reflected from a given screen).

There is a need in the art for movable carriers (such as projector carriers and/or screen carriers). Such movable carriers may be incorporated into shooting systems that utilize projector(s) and target rotational means (in some embodiments) and with shot detection methods (in some embodiments) that may allow for diverse target images and/or reactive targets—of either videos or stationary images. There's a need for systems with the abovementioned features that do not require one or more of the mechanical sophistication, cost, and large amount of space necessary for some of the targetry systems found in the prior art. Shooting systems described herein may exist on a singular rail (or more or no such rail) and may be used indoors or outdoors; and does not sacrifice the realism that is missing in the prior art using pre-printed targets, light guns or other simulated firearms.

Further, there is a need for trolleys of reduced mechanics that implements near instantaneous change of target or scenario without a motorized rotational/turning device.

Additionally, there is a need for systems that utilize wireless technology, such as, but not limited to, 2-way radios, antennas, WiFi, and/or cellular to allow a user (e.g., a shooter, an instructor, an observer, and/or a judge) to communicate, control, and/or interact with the system through a monitor, a screen, a TV, a tablet computing device, a smartphone, a laptop, a server, a computer, user input device, and/or the like.

It is to these ends that the present invention has been developed.

BRIEF SUMMARY OF THE INVENTION

To minimize the limitations in the prior art, and to minimize other limitations that will be apparent upon reading and understanding the present specification, the present invention describes various embodiments of systems for improving shooting performance and/or other objectives as noted below; as well as, various carriers configured for that purpose and/or objectives.

In some such embodiments, such systems may comprise: at least one projector, at least one screen, at least one carrier, and at least one pathway. The at least one projector may project one or more images upon at least some portion of the at least one screen. The at least one screen may receive and display the one or more images. The at least one carrier may house the at least one projector; and in some embodiments, may also house at least one screen mount for removably mounting the at least one screen. The at least one carrier may travel along the at least one pathway. A shooter may aim and shoot a firearm at the one or more images displayed upon the at least one screen.

It is an objective of the present invention to provide a system for improving shooting performance and/or for improving shooter skill, such as, but not limited to, accuracy and/or reaction time.

It is another objective of the present invention to provide a system for one or more of: recreational shooting, professional shooting, competition shooting, police shooting, law enforcement shooting, military shooting, and/or para-military shooting.

It is another objective of the present invention to provide a system for improving the shooting experience of the shooter.

It is another objective of the present invention to provide a system for improving the shooting experience of the shooter by the system being able to quickly provide a variety and diversity of target images, that may help to keep the shooter focused and interested; and where the system may near instantaneously, in real-time or near real-time, change what target image(s) may be displayed on a given target screen.

It is another objective of the present invention to provide a system that may near instantaneously switch between "shoot" and "no-shoot" targets; which may help to improve shooter decisions, reaction times, and alertness.

It is another objective of the present invention to provide a system that may provide for a more realistic and thus more engaging way of transitioning from "shoot" and "no-shoot" targets; for example, which may utilize video footage from a given projector.

It is another objective of the present invention to provide a system, in some embodiments, that eliminates and/or minimizes mechanical technologies for switching between "shoot" and "no-shoot" targets (e.g., by physically turning such targets). This may then save in costs associated with purchasing and maintaining such mechanical target switching technologies.

It is another objective of the present invention to provide a shooting system that eliminates or mitigates a need or reliance upon preprinted targets.

It is another objective of the present invention to provide a shooting system that utilizes realistic images as targets; where such images may be superior to at least most pre-existing pre-printed targets in terms of realism and/or image quality.

It is another objective of the present invention to provide a shooting system wherein there may be a camera integral to a carrier (such as a projector carrier and/or a target carrier).

It is another objective of the present invention to provide the shooting system with the camera integral to the carrier, such that wear and tear upon the carrier is reduced, as inclusion of the camera reduces a need to frequently deploy and retract a target associated with the carrier so that the shooter may review their accuracy and/or shooting performance; and/or so that shooter may swap out one target for another. Inclusion of such a camera may also reduce use of other independent target observing tools, like binoculars.

It is another objective of the present invention to provide a shooting system wherein a given shooting session may be memorialized by the camera recording the target for the given shooting session.

It is another objective of the present invention to provide a shooting system where the given camera may facilitate "shooter scoring analysis" by recording impacts from the firearm upon a given target, and then by use of an algorithm, determining and/or providing scoring feedback to interested parties, such as, but not limited to, the shooter.

It is yet another objective of the present invention to provide components for the above systems to properly function, such as, but not limited to, various carriers (e.g., projector carriers and/or screen carrier), various projectors, various screens, various cameras, translation mechanics to facilitate movement of the carriers, and/or the like.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 5 may depict a system for improving shooting performance, shown from a schematic side view.

FIG. 6 may depict a system for improving shooting performance, shown from a schematic side view.

FIG. 7A may depict a screen from a perspective view.

FIG. 7B may depict a screen from a perspective view.

FIG. 8 may depict a system for improving shooting performance, shown from a schematic side view.

REFERENCE NUMERAL SCHEDULE

Figure 1:
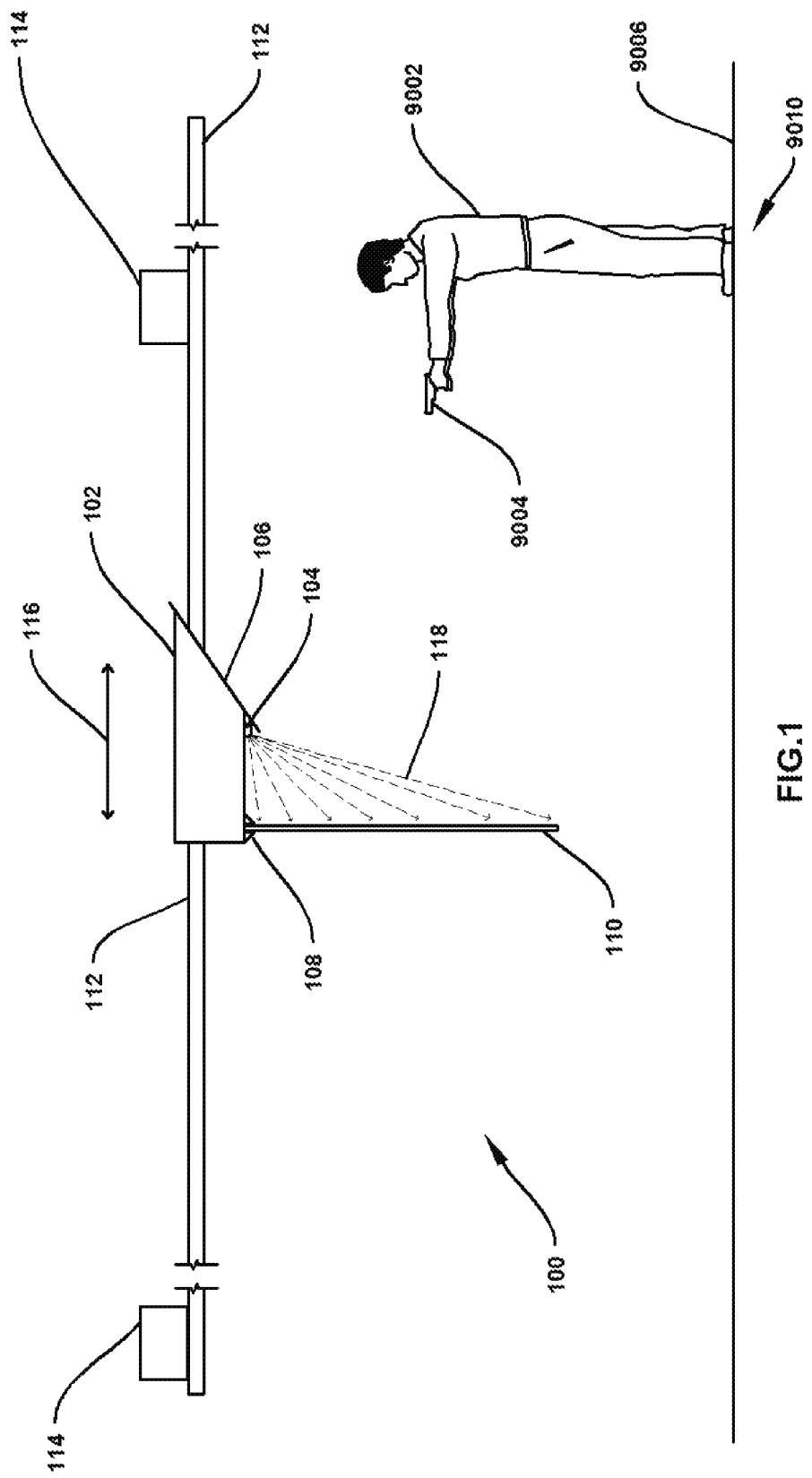
FIG. 1 may depict a system for improving shooting performance, shown from a schematic side view.

100 system 100
102 carrier 102
104 projector 104
106 deflector 106
108 screen mount 108
110 screen 110
112 track 112
114 track mover 114
116 direction of travel 116
118 direction of projection 118
200 system 200
202 carrier 202
204 projector 204
206 deflector 206
208 screen mount 208
210 screen 210
300 system 300
302 projector carrier 302
304 projector 304
306 deflector 306
308 screen mount 308
310 screen 310
316 screen carrier 316
318 deflector 318
400 system 400
402 projector carrier 402
404 projector 404
408 screen mount 408
406 deflector 406
410 screen 410
416 screen carrier 416
418 deflector 418
500 system 500
502 projector carrier 502
504 projector 504
506 deflector 506
508 screen mount 508
510 screen 510
512 camera 512
514 camera field of view 514
600 system 600
602 carrier 602
604 projector 604
606 deflector 606
608 screen mount 608
610 screen 610
620 pivot motion 620
622 rotational motion 622
710 screen 710
712 screen mount engagor 712
714 major surface 714
800 system 800
802 carrier 802
804 projector 804
806 deflector 806
808 screen mount 808
810 screen 810
824 ground mover 824
902 processor 902
904 memory 904
906 power source 906
908 network module 908
910 speaker 910
912 engagor 912
914 mover 914
916 wireless communication 916
918 positional sensor 918
920 communication port 920
922 shoe 922
1012 pathway 1012
9002 shooter 9002
9004 firearm 9004
9006 substrate 9006
9008 substrate 9008
9010 predetermined shooting location 9010

DETAILED DESCRIPTION OF THE INVENTION

Various embodiments of systems for improving shooting performance, as well as, various carriers configured for that purpose, are disclosed and described herein. In some such embodiments, such systems may comprise: at least one projector, at least one screen, at least one carrier, and at least one pathway. The at least one projector may project one or more images upon at least some portion of the at least one screen. The at least one screen may receive and display the one or more images. The at least one carrier may house the at least one projector; and in some embodiments, may also house at least one screen mount for removably mounting the at least one screen. The at least one carrier may travel along the at least one pathway. A shooter may aim and shoot a firearm at the one or more images displayed upon the at least one screen.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 may depict a system 100 for improving shooting performance, shown from a schematic side view. In some embodiments, system 100 may comprise: at least one projector 104, at least one carrier 102 (with at least one deflector 106, in some embodiments), at least one screen 110, and at least one pathway 112. In some embodiments, at least one projector 104 may be for projecting one or more images upon at least some portion of at least one screen 110. At least one screen 110 may be for displaying the one or more images emanating from at least one projector 104. In some embodiments, at least one screen 110 may be for configured for receiving the one or more images emanating from at least one projector 104. In FIG. 1, direction of projection 118 may indicate the one or more images emanating from at least one projector 104 towards the at least some portion of at least one screen. In some embodiments, at least one carrier 102 may substantially house at least one projector 104. In some embodiments, at least one carrier 102 may travel along at least one pathway 112. In some embodiments, a shooter 9002 may aim and shoot a firearm 9004 at the one or more images displayed upon at least one screen 110. That is, at least one screen 110 may be a target of shooter 9002. In some applications of system 100, shooter 9002 may be supported by substrate 9006. In some applications of system 100, shooter 9002 may be shooting from predetermined shooting location 9010. Predetermined shooting location 9010 may be one or more locations of a given shooting range where shooter(s) 9002 are supposed to shoot from. Substrate 9006 (and/or substrate 9008 shown in FIG. 8) may be a floor (or ground) of a given shooting range.

In some embodiments, at least one carrier 102 may comprise an outer covering. In some embodiments, at least one carrier 102 may comprise framework located substantially in or attached in at least one location to the outer covering. Various components of at least one carrier 102, including electrical components, may be attached to one or more of: the outer covering and/or the framework. In some embodiments, the outer covering may be substantially removable from the framework. In some embodiments, the outer covering may comprise at least one access door and/or at least one access panel, for accessing an internal volume of at least one carrier 102. In some embodiments, the framework may be rigid. In some embodiments, at least some portion of the outer covering may be armored.

In some embodiments, at least one projector 104 may be one or more of: a LED projector, a LCD projector, a DLP projector, a CRT projector, the like, and/or combinations thereof. In some embodiments, at least one projector 104 may range in brightness from about 50 to about 5,500 lumens. In some embodiments, an aspect ratio of at least one projector 104 may be configured to substantially match a given two dimensional size and shape of major surface 714 of at least one screen 110.

In some embodiments, the one or more images may be one or more of static images or dynamic images. In some embodiments, such a static image may be a still image, i.e., an image with no motion inherent to the image, such as, but not limited to a photo or a photograph. In some embodiments, such a dynamic image may be a moving image, wherein movement is inherent to the image, such as, but not limited to video or movie footage. In some embodiments, such a dynamic image may be an animation.

In some embodiments, the one or more images may be predetermined. In some embodiments, the one or more images may be selected from a library of such images. In some embodiments, the one or more images may be one or more of non-transitorily stored in at least one memory 904 or generated from an image generator. See FIG. 9 for at least one memory 904. In some embodiments, the library of such images may be non-transitorily stored in at least one memory 904. In some embodiments, images generated from the image generator may be non-transitorily stored in at least one memory 904 and/or transmitted to at least one projector 104, either in real-time or with some predetermined, settable, or adjustable time delay. For example, and without limiting the scope of the present invention, in some embodiments, this time may be two days or less, down to real-time.

Continuing discussing FIG. 1, in some embodiments, at least one carrier 102 may comprise at least one screen mount 108. In some embodiments, at least one screen mount 108 may attach to at least one screen 110. In some embodiments, at least one screen mount 108 may removably attach to at least one screen 110. In some embodiments, at least one screen mount 108 may be a clip for clipping onto screen mount engagor 712 of at least one screen 110. (See e.g., FIG. 7A for screen mount engagor 712.) Such a clip may grip by friction. Such a clip may be spring powered. Such a clip may also be actuated by a power source (e.g., electrical, hydraulic, pneumatic, and/or the like). Such a clip may be activated by a switch or a sensor. In some embodiments, a relationship between at least one projector 104 and at least one screen 110 may be such that at least one projector 104 and at least one screen 110 may be at a predetermined distance (or a fixed distance) from each other on or in at least one carrier 102. For example, and without limiting the scope of the present invention, in some embodiments, this predetermined distance (or this fixed distance) between at least one projector 104 and at least one screen 110 may be ten feet or less down to about 0.5 inch; where "about" may be plus or minus 10% of a half inch.

In some embodiments, at least one projector 104 may be located before screen mount 108, with respect to deflector 106. In some embodiments, at least one projector 104 may be located before screen mount 108, with respect to predetermined shooting location 9010. See e.g., FIG. 1; see also FIG. 3 for a similar configuration. Whereas, in other embodiments, screen mount 208 may be located before projector 204, with respect to deflector 206. In some embodiments, embodiments, screen mount 208 may be located before projector 204, with respect to predetermined shooting location 9010. See e.g., FIG. 2; see also FIG. 4 for a configuration similar to FIG. 2.

In some embodiments, at least one pathway 112 may be at least one elongate member that comprises one or more of: a track, a rail, a chain, a cable, a belt, or substrate 9006 and/or 9008. In FIG. 1, at least one pathway 112 may be a track, a rail, a chain, a cable, and/or a belt.

In some embodiments, a cross-section of this elongate member may resemble a letter "C" or a letter "U" or a letter "I" and may provide retaining geometry to capture one or more wheels of engagor 912. See FIG. 9 for engagor 912. Engagor 912 may be a component of carrier 102. Such capture may be removable in some embodiments. Furthermore, such an elongate member may be mounted to substrate 9006 and/or 9008 or above substrate 9006 and/or 9008. Mounting the elongate member above substrate 9006 and/or 9008 may be accomplished via mounting the elongate member to a plurality of posts (pillars), to a ceiling, walls, fences, and/or to a roof above substrate 9006 and/or 9008. A plurality of mounting brackets may aid in mounting the at least one elongate member of at least one pathway 112 to such posts, ceiling, walls, fences, and/or roof.

Continuing discussing FIG. 1, in some embodiments, direction of travel 116 may indicate directions that carrier 102 may travel in, with respect to at least one pathway 112. In some embodiments, direction of travel 116 may refer to forwards and/or backwards directions that carrier 102 may travel in, along at least one pathway 112; wherein forwards and/or backwards may be with respect to predetermined shooting location 9010. In some embodiments, at least one pathway 112 may extend away from predetermined shooting location 9010, for a predetermined distance. In some embodiments, at least one pathway 112 may vary laterally (e.g., from left-to-right and vice-versa) with respect to predetermined shooting location 9010. In some embodiments, at least one pathway 112 may vary vertically (within predetermined limits) with respect to predetermined shooting location 9010 and/or with respect to substrate 9006 or 9008. At least one carrier 102 may travel along such at least one pathway 112. See also FIG. 10 and its accompanying discussion.

Continuing discussing FIG. 1, in some embodiments, at least one pathway 112 may be fixed with respect to substrate 9006. In some embodiments, at least one pathway 112 may translate with respect to substrate 9006. In embodiments, where at least one pathway 112 may translate with respect to substrate 9006, system 100 may also comprise at least one track mover 114; and at least one pathway 112 may be one or more of a cable, a chain, a belt, a plurality of linked rails, or a plurality of linked tracks. In some embodiments, at least one track mover 114 may cause such pathways 112 to translate (such as with respect to substrate 9006). In some embodiments, 114 may engage such at least one pathways 112. And engagor 912 of carrier 102 may physically engage such at least one pathways 112, such that at least one pathway 112 and carrier 102 may be fixed with respect to each other and translate together. In some embodiments, where at least one pathway 112 translates with respect to substrate 9006, carrier 102 may not translate with respect to such at least one pathway 112. In this embodiment, at least one track mover 114 may be a set of oppositely disposed pulleys to facilitate sliding translation of such a cable a chain, a belt, a plurality of linked rails, or a plurality of linked tracks. See e.g., FIG. 1. Such pulleys may be manually operated by an operator (e.g., shooter 9002). Further, in some embodiments, track mover 114 may also comprise one or more motors to power movement of carrier 102 that is physically engaged to this at least one pathway 112 via engagor 912. See FIG. 1 (for track mover 114) and see FIG. 9 (for engagor 912).

In some embodiments, a given carrier (e.g., 102, 202, 302, 402, 502, 602, and/or 802) may comprise at least one deflector 106. For example, and without limiting the scope of the present invention, this deflector may be 106, 206, 306, 318, 406, 418, 506, 606, and 806. See e.g., FIG. 1, FIG. 2, FIG. 3, FIG. 4, FIG. 5, FIG. 6, and FIG. 8. In some embodiments, such a deflector (e.g., 106) may substantially cover external surfaces of the given carrier (e.g., 102, 202, 302, 402, 502, 602, and/or 802) that are disposed between the at least one carrier (e.g., 102, 202, 302, 402, 502, 602, and/or 802) and predetermined shooting location 9010. This at least one deflector (e.g., 106) may minimize harm to the at least one carrier (e.g., 102, 202, 302, 402, 502, 602, and/or 802) and/or its components from impacts originating at or near predetermined shooting location 9010. In some embodiments, such a deflector (e.g., 106) may be one or more sheets of armor. In some embodiments, such a deflector (e.g., 106) may be substantially constructed of an impact resistant material. In some embodiments, such impact resistant materials may be one or more: steel plate(s), Kevlar, and/or the like. In some embodiments, a portion of the outer covering of a given carrier (e.g., 102) may be a given deflector (e.g., 106). In some embodiments, when a given carrier (e.g., 102, 202, 302, 402, 502, 602, and/or 802) may be in use with a particular shooter 9002 in predetermined shooting location 9010, then an angle between shooter 9002 and a given deflector (e.g., 106) on that given carrier (e.g., 102, 202, 302, 402, 502, 602, and/or 802) may be greater than 90 degrees, which may help to deflect harmful impacts upon that given deflector (e.g., 106).

Figure 2:
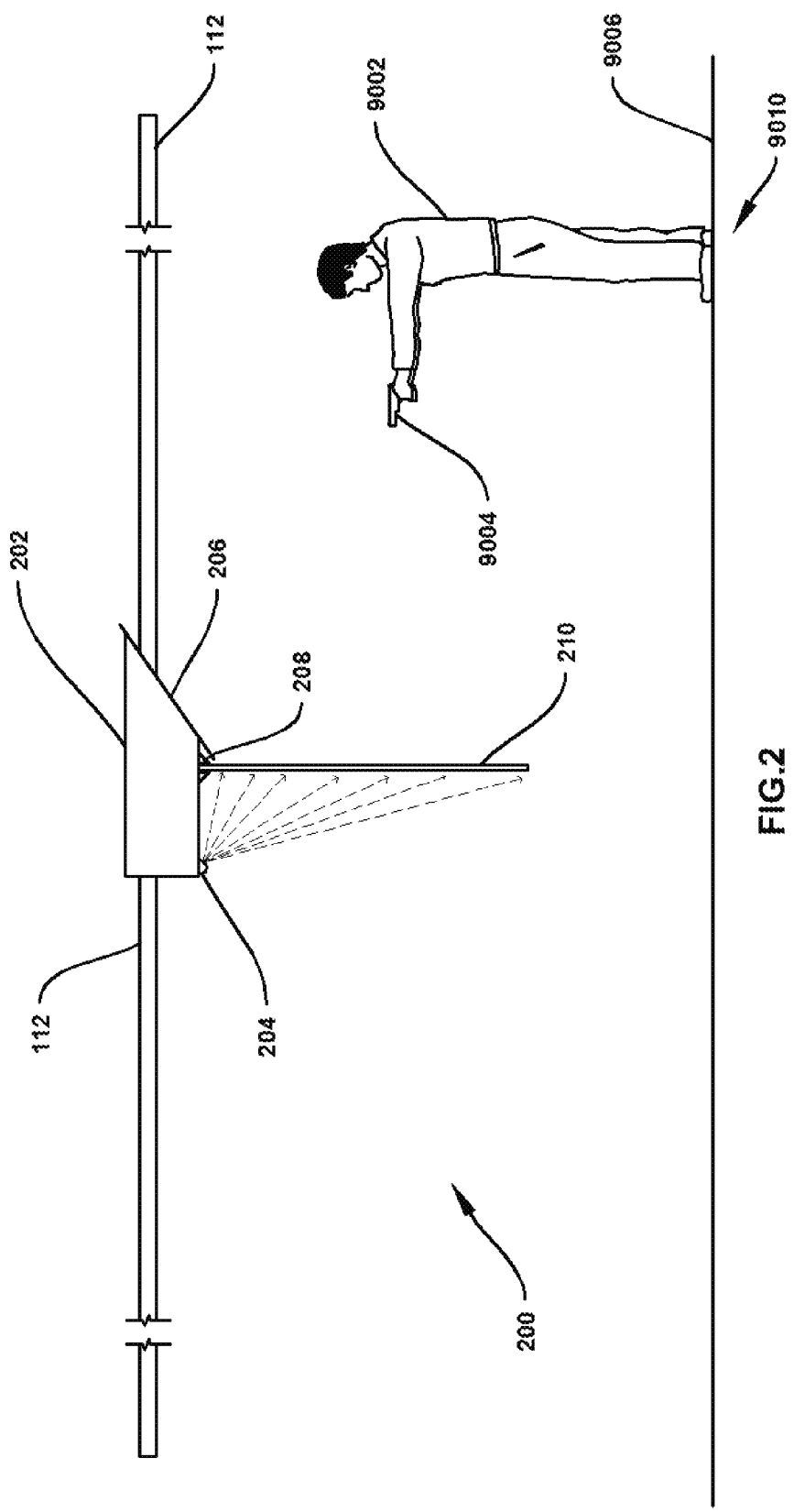
FIG. 2 may depict a system for improving shooting performance, shown from a schematic side view.

FIG. 2 may depict a system 200 for improving shooting performance, shown from a schematic side view. In some embodiments, system 200 may comprise: at least one projector 204, at least one carrier 202 (with at least one deflector 206, in some embodiments), at least one screen 210, and at least one pathway 112. In some embodiments, at least one projector 204 may share at least some of the structures and functions of at least one projector 104. In some embodiments, at least one carrier 202 may share at least some of the structures and functions of at least one carrier 102. In some embodiments, at least one screen 210 may share at least some of the structures and functions of at least one screen 110.

In some embodiments, screen mount 208 may be located before projector 204, with respect to deflector 206. In some embodiments, embodiments, screen mount 208 may be located before projector 204, with respect to predetermined shooting location 9010. In system 200, and/or with at least one carrier 202, at least one screen 210 may be at least partially or substantially transparent, such that the one or images may be seen from predetermined shooting location 9010 even when at least one projector 204 may be disposed behind at least one screen 210 with respect to predetermined shooting location 9010.

Figure 3:
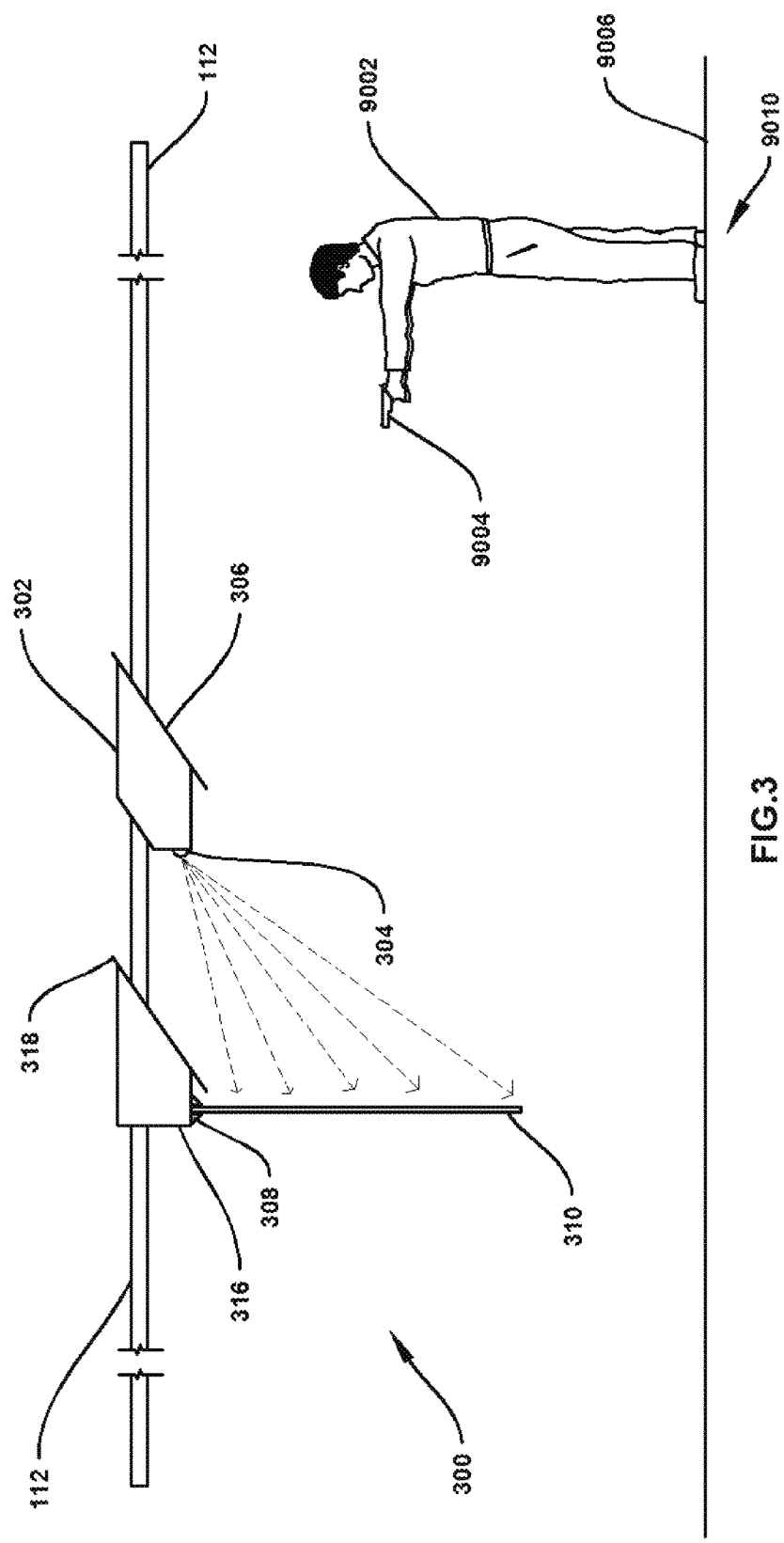
FIG. 3 may depict a system for improving shooting performance, shown from a schematic side view.

FIG. 3 may depict a system 300 for improving shooting performance, shown from a schematic side view. In some embodiments, system 300 may comprise: at least one projector 304, at least one carrier 302 (with at least one deflector 306, in some embodiments), at least one screen 310, and at least one pathway 112. In some embodiments, at least one projector 304 may share at least some of the structures and functions of at least one projector 104. In some embodiments, at least one carrier 302 may share at least some of the structures and functions of at least one carrier 102. In some embodiments, at least one screen 310 may share at least some of the structures and functions of at least one screen 110.

In some embodiments, system 300 may comprise a second carrier that may be a screen carrier 316. In some embodiments, at least one carrier 302 may be a projector carrier 302. In some embodiments, projector carrier 302 may house at least one projector 304. In some embodiments, screen carrier 316 may comprise at least one screen mount 308. In some embodiments, at least one screen mount 308 may attach to at least one screen 310. In some embodiments, at least one screen mount 308 may removably attach to at least one screen 310. In some embodiments, projector carrier 302 and screen carrier 316 may be at variable distances from each other. In some embodiments, at least one projector 304 and at least one screen 310 may travel along a same pathway 112. In some embodiments, at least one projector 304 and at least one screen 310 may be at variable distances from each other. A minimum distance may be defined by dimensions of projector carrier 302 and of screen carrier 316. For example, and without limiting the scope of the present invention, such a minimum distance may be one inch. A maximum distance may be defined by a maximum length of at least one pathway 112 and wherein clarity of the one or more images emanating from at least on projector 304 begins to be unclear on at least one screen 310. In some embodiments, at least one projector 304 and at least one screen 310 may travel along at least two different pathways 112. In some embodiments, projector carrier 302 may comprise engagor 912 and/or mover 914, for physical communications with at least one pathway 112. In some embodiments, screen carrier 316 may comprise engagor 912 and/or mover 914, for physical communications with at least one pathway 112; wherein these engagor 912 and/or mover 914 are not the same engagor 912 and/or mover 914 that may be part of projector carrier 302.

In some embodiments, projector 304 may be located before screen mount 308, with respect to deflector 306. In some embodiments, projector 304 may be located before screen mount 308, with respect to predetermined shooting location 9010. See e.g., FIG. 3. Whereas, in other embodiments, screen mount 408 may be located before projector 404, with respect to deflector 418. In some embodiments, screen mount 408 may be located before projector 404, with respect to predetermined shooting location 9010. See e.g., FIG. 4.

Figure 4:
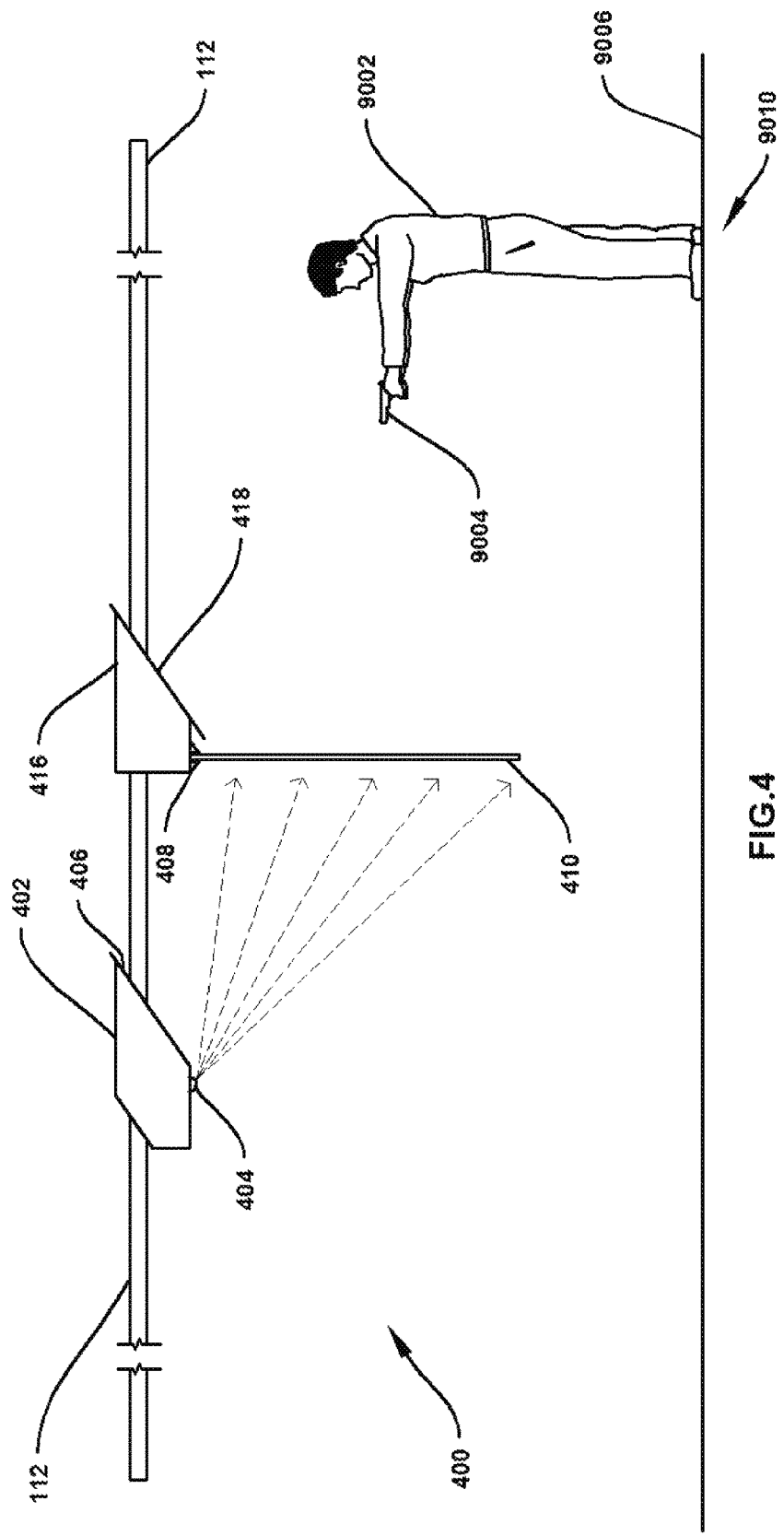
FIG. 4 may depict a system for improving shooting performance, shown from a schematic side view.

FIG. 4 may depict a system 400 for improving shooting performance, shown from a schematic side view. In some embodiments, system 400 may comprise: at least one projector 404, at least one carrier 402 (with at least one deflector 406, in some embodiments), at least one screen 410, and at least one pathway 112. In some embodiments, at least one projector 404 may share at least some of the structures and functions of at least one projector 104. In some embodiments, at least one carrier 402 may share at least some of the structures and functions of at least one carrier 102. In some embodiments, at least one screen 410 may share at least some of the structures and functions of at least one screen 110.

In some embodiments, system 400 may comprise a second carrier that may be a screen carrier 416. In some embodiments, at least one carrier 402 may be a projector carrier 402. In some embodiments, projector carrier 402 may house at least one projector 404. In some embodiments, screen carrier 416 may comprise at least one screen mount 408. In some embodiments, at least one screen mount 408 may attach to at least one screen 410. In some embodiments, at least one screen mount 408 may removably attach to at least one screen 410. In some embodiments, projector carrier 402 and screen carrier 416 may be at variable distances from each other. In some embodiments, at least one projector 404 and at least one screen 410 may travel along a same pathway 112; e.g., by using their respective carriers, 402 and 416. In some embodiments, at least one projector 404 and at least one screen 410 may be at variable distances from each other. A minimum distance may be defined by dimensions of projector carrier 402 and of screen carrier 416. For example, and without limiting the scope of the present invention, such a minimum distance may be about one inch. A maximum distance may be defined by a maximum length of at least one pathway 112 and wherein clarity of the one or more images emanating from at least on projector 404 begins to be unclear on at least one screen 410. In some embodiments, at least one projector 404 and at least one screen 410 may travel along at least two different pathways 112. In some embodiments, projector carrier 402 may comprise engagor 912 and/or mover 914, for physical communications with at least one pathway 112. In some embodiments, screen carrier 416 may comprise engagor 912 and/or mover 914, for physical communications with at least one pathway 112; wherein these engagor 912 and/or mover 914 are not the same engagor 912 and/or mover 914 that may be part of projector carrier 402.

In some embodiments, screen mount 408 may be located before projector 404, with respect to deflector 418. In some embodiments, screen mount 408 may be located before projector 404, with respect to predetermined shooting location 9010. See e.g., FIG. 4.

Whereas, in other embodiments, projector 304 may be located before screen mount 308, with respect to deflector 306. In some embodiments, projector 304 may be located before screen mount 308, with respect to predetermined shooting location 9010. See e.g., FIG. 3.

FIG. 5 may depict a system 500 for improving shooting performance, shown from a schematic side view. In some embodiments, system 500 may comprise: at least one projector 504, at least one carrier 502 (with at least one deflector 506, in some embodiments), at least one screen 510, and at least one pathway 112. In some embodiments, at least one projector 504 may share at least some of the structures and functions of at least one projector 104. In some embodiments, at least one carrier 502 may share at least some of the structures and functions of at least one carrier 102. In some embodiments, at least one screen 510 may share at least some of the structures and functions of at least one screen 110.

In some embodiments, system 500 may comprise at least one camera. In some embodiments, carrier 502 may comprise the at least one camera as camera 512. In some embodiments, the at least one camera may record and/or observe a camera field of view 514 that may be of substantially all of a major surface 714 of at least one screen 510. (See e.g., FIG. 7A and/or FIG. 7B for major surface 714.) Such camera(s) may facilitate one or more of: shooter scoring analysis by recording impacts from firearm 9004 upon major surface 714 and/or remote viewing of major surface 714 upon one or more display devices.

In some embodiments, such one or more display devices may be in communication with the at least one camera, such as, but not limited to, camera 512. In some embodiments, the one or more display devices may be selected from one or more of: a monitor and/or a screen, either independent or associated with a TV; a tablet computing device; a smartphone; a laptop; a server; a computing device; a computer; and/or the like. In some embodiments, this one or more display devices may be located locally to shooter 9002. Locally may be on the premises of the shooting range. In some embodiments, the one or more display devices may be located remotely with respect to the shooting range and/or with respect to predetermined shooting location 9010. In some embodiments, what may be viewed on such one or more display devices of camera field of view 514 may in real time or near real time (in some embodiments, near real time may comprise a delay of less than one minute). In some embodiments, what may be viewed on such one or more display devices of camera field of view 514 may be of earlier recorded events by the at least one camera, such as, camera 512.

FIG. 6 may depict a system 600 for improving shooting performance, shown from a schematic side view. In some embodiments, system 600 may comprise: at least one projector 604, at least one carrier 602 (with at least one deflector 606, in some embodiments), at least one screen 610, and at least one pathway 112. In some embodiments, at least one projector 604 may share at least some of the structures and functions of at least one projector 104. In some embodiments, at least one carrier 602 may share at least some of the structures and functions of at least one carrier 102. In some embodiments, at least one screen 610 may share at least some of the structures and functions of at least one screen 110.

In some embodiments, at least one screen mount 608 may be electrically powerable to articulate at least one screen 610 with respect to the at least one carrier 602. In some embodiments, at least one screen mount 608 may comprise one or more motors, servos, and/or actuators. In some embodiments, at least one screen 610 may be articulable by one or more of: pivoting about where the least one screen mount 608 attaches to at least one screen 610, noted by pivot motion 620 and/or rotating about an axis running from at least one screen 610 to the at least one screen mount 608, noted by rotational motion 622. In such embodiments, at least one screen mount 608 may be in electrical communication with one or more of at least one processor 902 and/or at least one power source 906, see e.g., FIG. 9 for at least one processor 902 and at least one power source 906.

FIG. 7A may depict at least one screen 110 from a perspective view. FIG. 7B may depict at least one screen 710 from a perspective view. Screen 110 may differ from screen 710 in terms of overall shape of the respective screen, as shown in FIG. 7A and in FIG. 7B.

In some embodiments, at least one screen 110 may be a substantially planar member with a major surface 714 for displaying the one or more images. In some embodiments, major surface 714 may be substantially planar. In some embodiments, major surface 714 may be one or more of substantially flat or curved with a predetermined radius (i.e., with some curvature).

In some embodiments, a two dimensional projection of major surface 714, in a direction orthogonal from major surface 714, may be selected from: a regular polygon, with or without rounded corners; an irregular polygon, with or without rounded corners; a circle; an ellipse; a semicircle; a half ellipse; and the like. For example, and without limiting the scope of the present invention, in FIG. 7A, such a two dimensional projection may be rectangle. For example, and without limiting the scope of the present invention, in FIG. 7B, such a two dimensional projection may be a circle.

In some embodiments, one or more screens 110 and/or 710 may be substantially one or more of: flexible, semi-rigid, or rigid. In some embodiments, one or more screens 110 and/or 710 may be substantially one or more of: transparent, or opaque.

In some embodiments, one or more screens 110 and/or 710 may be substantially constructed of one or more of: paper, fabric, canvas, cardboard, foam board, plastic, and/or the like.

In some embodiments, at least one screen mount 108 (and/or 208, 308, 408, 508, 608, 808) may attach to at least one screen 110 and/or 710 at screen mount engagor 712. In some embodiments, at least one screen mount 108 may removably attach to at least one screen 110 at screen mount engagor 712. In some embodiments, screen mount engagor 712 may be region on a given screen 110 and/or 710 configured to engage with 108 (and/or 208, 308, 408, 508, 608, 808). In some embodiments, screen mount engagor 712 may be located at or proximate to an outside edge of a given screen 110 and/or 710. In some embodiments, screen mount engagor 712 may be located about halfway along an outside edge of a given screen 110 and/or 710. See e.g., FIG. 7A and/or FIG. 7B.

FIG. 8 may depict a system 800 for improving shooting performance, shown from a schematic side view. In some embodiments, system 800 may comprise: at least one projector 804, at least one carrier 802 (with at least one deflector 806, in some embodiments), at least one screen 810, ground mover 824, and at least one pathway 112 (which may be at least one substrate 9008). At least one carrier 802 may roll or crawl along substrate 9008. In some embodiments, at least one projector 804 may share at least some of the structures and functions of at least one projector 104. In some embodiments, at least one carrier 802 may share at least some of the structures and functions of at least one carrier 102. In some embodiments, at least one screen 810 may share at least some of the structures and functions of at least one screen 110.

In some embodiments, at least one carrier 802 may comprise ground mover 824. For example, applying at least one carrier 802 to carrier 102 in FIG. 9, i.e., when carrier 802 replaces carrier 102 in FIG. 9, then there may be no engagor 912 and ground mover 824 may replace mover 914.

In some embodiments, ground mover 824 may comprise one or more of: one or more electrical motors, a transmission, one or more gears, one or more belts (e.g., drive belts), one or more axles (shafts), one or more motor drivers (e.g., PCB motor driver), suspension springs and/or struts, two or more wheels, and/or at least a pair of treaded tracks. For example, such one or more electrical motors may be one or more DC motors. In some embodiments, such one or more motors may be housed entirely or substantially within at least one carrier 802. In some embodiments, the one or more motor drivers may be handled by at least one processor 902. In some embodiments, the one or more motor drivers may be handled by a secondary processor board to act as a dedicated motor controller, with a secondary processor. In some embodiments, at least a portion of ground mover 824 may physically engage substrate 9008. In some embodiments, this portion may be portions of the two or more wheels, and/or the at least a pair of treaded tracks. In some embodiments, ground mover 824 may cause at least one carrier 802 to translate along substrate 9008. See e.g., FIG. 8. Substrate 9008 may be uneven. Substrate 9008 may be located outdoors. Substrate 9008 may be a ground surface or a floor surface.

In some embodiments, at least one carrier 802 may move along substrate 9008 in a predetermined pattern and/or within predetermined constraints. Position of at least one carrier 802 may be determined by at least one positional sensor 918. Position of at least one carrier 802 may be determined by a GPS module of at least one carrier 802. Similar to GPS position determination, utilizing trilateration and/or measuring signal strengths, the shooting range may comprise a plurality of radio transmitters/transceivers (e.g., at fixed and known locations) that at least one network module 908 of at least one carrier 802 may wirelessly communicate with to determine position of at least one carrier 802 with respect to substrate 9008, within the given shooting range; which may be an outdoor or indoor shooting range.

Figure 9:
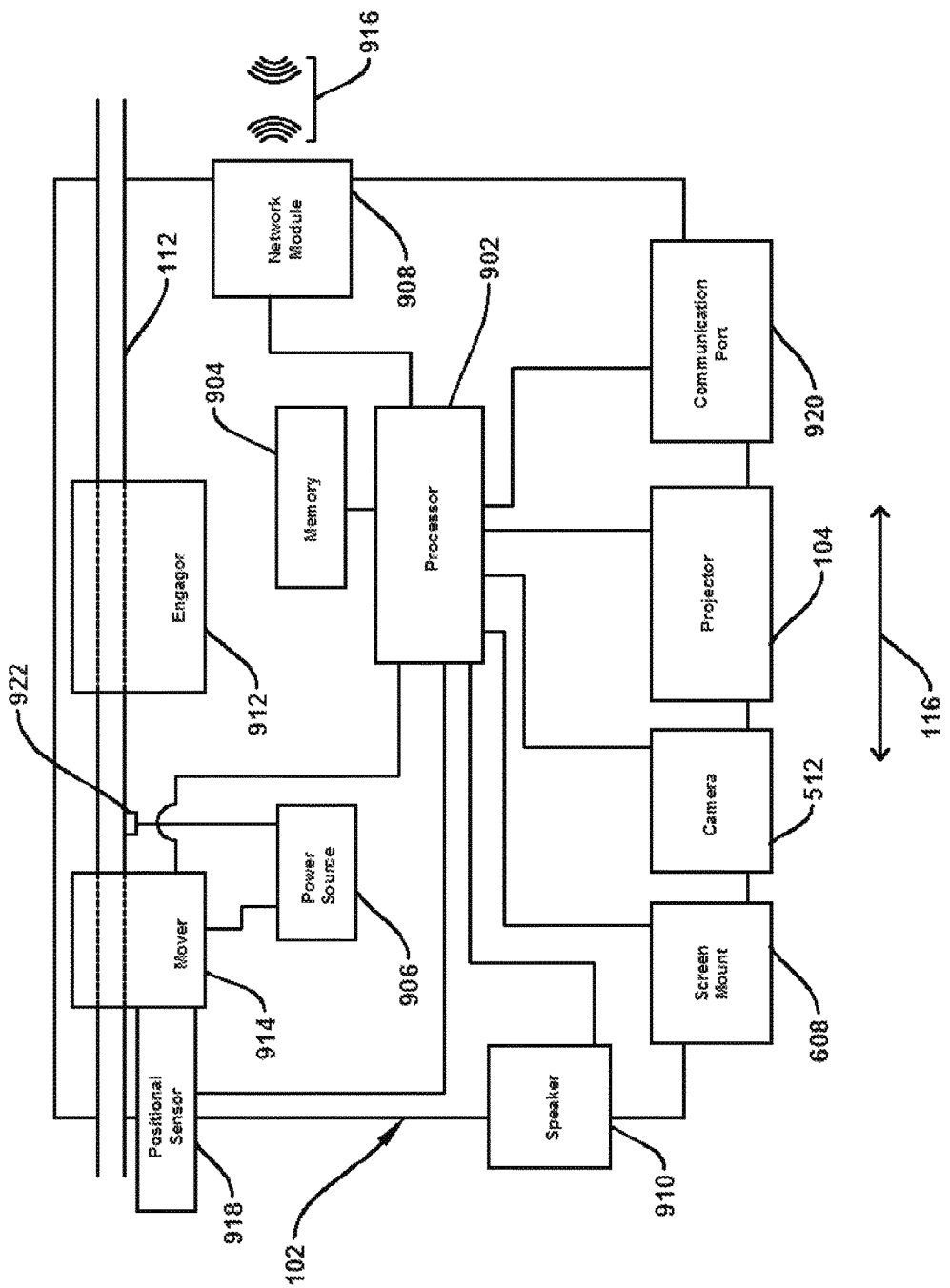
FIG. 9 may depict a block diagram showing various components, including some optional components, of a carrier.

FIG. 9 may depict a block diagram showing various components, including some components which may be optional for some embodiments, of the at least one carrier, such as carrier 102, 202, 302, 402, 502, 602, and/or 802.

In some embodiments, such at least one carrier must comprise: at least one deflector (e.g., 106), at least one processor 902, at least one memory 904, and least one power source 906, and at least one communication component. In some embodiments, such at least one carrier must further comprise one or more of: at least one projector (e.g., 104); at least one screen mount (e.g., 108); both at least one projector (e.g., 104) and at least one screen mount (e.g., 108). In some embodiments, such at least one carrier may further comprise translation mechanics for moving the at least one carrier along at least one pathway 112 or along substrate 9008.

In some embodiments, at least one processor 902 may be for reading and implementing programmable code. In some embodiments, the programmable code may be non-transitorily stored in at least one memory 904. In some embodiments, the programmable code may be for one or more of: controlling a position of the at least one carrier with respect to the at least one pathway 112 (or substrate 9008); or for controlling media content emitted from the at least one carrier. In some embodiments, at least some of the programmable code may be firmware. For example, and without limiting the scope of the present invention, the programmable code may control the media content emitted from the at least one projector (e.g., 104). The one or more images emitted by the at least one projector (e.g., 104) may be a subset of the media content. In some embodiments, the media content may comprise more than just the one or more images. In some embodiments, the media content may also comprise sounds for emission from at least one speaker 910.

In some embodiments, at least one processor 902 may be integrated into a main processor board and/or a printed circuit board (PCB). In some embodiments, at least one memory 904 may also be integrated into such main processor board and/or PCB.

In some embodiments, at least one memory 904 may be in electrical and/or optical communication with at least one processor 902. In some embodiments, at least one memory 904 may non-transitory store one or more of: the programmable code, the media content, the one or more images, and/or recordings from the at least one camera, such as camera 512. In some embodiments, at least some of the at least one memory 904 may perform as a cache, temporarily, storing one or more of: the programmable code, the media content, the one or more images, and/or recordings from the at least one camera.

In some embodiments, the image generator may comprise at least one processor 902, at least one memory 904, and/or at least some of the programmable code that may be non-transitorily stored within at least one memory 904.

In some embodiments, the at least one communication component may comprise one or more of: at least one communication port 920 or at least one network module 908. In some embodiments, the at least one communication component may be in electrical and/or optical communication with at least one processor 902.

In some embodiments, at least one network module 908 may comprise at least one antenna for wireless communications 916 with one or more of: a computing device, a mobile computing device, a smartphone, a tablet computing device, a server, a laptop, a desktop computer, a NFC tag, a RFID tag, and/or the like. In some embodiments, at least one network module 908 may be a NFC reader and/or a RFID reader.

This at least one antenna may be configured to transmit and/or to receive various radio frequency signals and/or optical signals for various wireless communication protocols, such as but not limited to, direct wireless communications and/or indirect wireless communications. In some embodiments, at least one network module 908 may be configured for various WiFi and/or cellular communications. Direct wireless communications may comprise BLUETOOTH, ZigBee, NFC (near field communication), RFID (radio frequency ID), IR (infrared), and the like wireless communications; where "direct" may refer to a pairing between two devices, one of which may be a given carrier (e.g., 102). Whereas, indirect wireless communications may utilize one or more intermediary devices (such as, but not limited to routers, switches, hotspots, repeaters, modems, gateways, and the like) to facilitate communication, wherein such communication may be at least in part across a LAN (local area network), a WAN (wide area network), and/or the Internet. In some embodiments, at least one network module 908 may comprise two or more wireless modules, with two or more antennas, to handle a diversity of such different types of wireless communications protocols.

Communications to a given carrier (e.g., 102) may be for one or more of: transmitting the media content; updating the media content; transmitting the one or more images; transmitting the programmable code; updating the programmable code; transmitting positional instructions for the given carrier (e.g., 102); requesting and/or receiving operational and/or error logs; requesting and/or receiving data; and/or requesting and/or receiving inputs from one or more the at least one camera (e.g., camera 512), at least one microphone, and/or at least one positional sensor 918. Such communications may be via one or more of: at least one network module 908 and/or via at least one communication port 920. In some embodiments, the at least one carrier (e.g., 102) may be remotely controlled via using one or more of: at least one network module 908 and/or via at least one communication port 920. For example, shooter 9002 may via a smartphone or tablet computing device in wireless communication with the at least one carrier (e.g., 102) to remotely control position of the at least one carrier (e.g., 102) and/or to remotely control the media content emitted from the least one projector (e.g., 104) and/or emitted from at least one speaker 910. Or similarly, a trainer or an administrator may use some other computing device in wireless communication with the at least one carrier (e.g., 102) to remotely control position of the at least one carrier (e.g., 102) and/or to remotely control the media content emitted from the least one projector (e.g., 104) and/or emitted from at least one speaker 910. Wherein such wireless communications 916 may be facilitated by at least one network module 908.

In some embodiments, the translation mechanics may comprise one or more of: mover 914; mover 914 with engagor 912; and/or both engagor 912 and track mover 114. Note, in some embodiments, track mover 114 may not be a component of a given carrier (e.g., 102). In some embodiments, the translation mechanics may facilitate movement of the at least one carrier (e.g., 102) along at least one pathway 112 or along substrate 9008.

In some embodiments, mover 914 may comprise one or more of: one or more electrical motors, a transmission, one or more gears, one or more belts (e.g., drive belts), one or more axles (shafts), one or more motor drivers (e.g., PCB motor driver), and/or one or more wheels. For example, such one or more electrical motors may be one or more DC motors. In some embodiments, such one or more motors may be housed entirely or substantially within the given carrier (e.g., 102). In some embodiments, the one or more motor drivers may be handled by at least one processor 902. In some embodiments, the one or more motor drivers may be handled by a secondary processor board to act as a dedicated motor controller, with a secondary processor. In some embodiments, at least a portion of the mover 914 may physically engage at least one pathway 112, substrate 9008, and/or engagor 912. In some embodiments, mover 914 may cause the at least one carrier (e.g., 102) to translate along at least one pathway 112 or substrate 9008. See e.g., FIG. 9.

In some embodiments, engagor 912 may physically engage at least one pathway 112, such that the at least one carrier (e.g., 102) and at least one pathway 112 may be physically coupled to each other. See e.g., FIG. 9. In some embodiments, such physical coupling may be attachment. In some embodiments, such physical coupling may be removable attachment. For example, in embodiments where at least one pathway 112 may be located substantially above a given substrate or above shooter 9002; engagor 912 may permit the given carrier (e.g., 102) to hang from such at least one pathway 112. In some embodiments, engagor 912 may physically engage at least one pathway 112, such that the at least one carrier (e.g., 102) may translate along at least one pathway 112. In some embodiments, engagor 912 may comprise one or more wheels. In some embodiments, such one or more wheels may be configured to grip, to receive, or be received by at least one pathway 112 such that in normal operation the given carrier (e.g., 102) and at least one pathway 112 remain physically coupled to each other. And mover 914 may then cause such wheels to rotate and thus move the given carrier (e.g., 102) along at least one pathway 112. In some embodiments, mover 914 and engagor 912 may be integrated together, forming a single subassembly.

Mechanical components of mover 914 and/or engagor 912 and cross-sectional geometry of at least one pathway 112, that may facilitate hanging and/or movement of at least one carrier 102 (or other carriers) along at least one pathway 112, are well understood in the relevant technical arts. See e.g., U.S. Pat. No. 5,419,260 from Hamilton; and see U.S. Pat. No. 5,676,189 from Zeeb; where such prior disclosed mechanical components for translation and track cross-sectional geometry are incorporated herein.

In some embodiments, at least one power source 906 may provide electrical power to the various electrical components of a given carrier (e.g., 102). In some embodiments, at least one power source 906 may provide electrical power to one or more of: at least one processor 902, at least one memory 904, the at least one projector (e.g., 104), the at least one screen mount (e.g., 608), the at least one communication component (e.g., one or more of communication port 920 and/or network module 908), and/or the least one translation mechanics (e.g., mover 914 and/or engagor 912). In some embodiments, at least one power source 906 may further provide electrical power to one or more of: the least one camera (e.g., camera 512), at least one speaker 910, at least one positional sensor 918, and/or at least one microphone.

In some embodiments, at least one power source 906 may comprise one or more batteries. Such one or more batteries may be substantially rechargeable in some embodiments. Battery recharging may utilize communication port 920 in some embodiments. That is in some embodiments, communication port 920 may be configured to receive electrical power; wherein such received electrical power may be used to recharge the one or more batteries; and/or used to power electrical components of the given carrier (e.g., 102). Such one or more batteries may be replaceable by one or more of: an access door in the given carrier, an access panel in the given carrier, and/or by removing at least a portion of the outer covering of the given carrier (e.g., 102).

In some embodiments, at least some portion of at least one pathway 112 may be electrified, such that at least one power source 906 may receive electrical power from this at least some portion of at least one pathway 112 that may be electrified. In some embodiments, the at least one carrier (e.g., 102) may comprise shoe 922. See e.g., FIG. 9. In some embodiments, shoe 922 may be in electrical communication with the at least some portion of at least one pathway 112 that may be electrified. In some embodiments, shoe 922 may be in electrical communication with at least one power source 906. In some embodiments, shoe 922 may function as an electrical power receiver.

In some embodiments, the at least one carrier (e.g., 102) may comprise one or more of: a manual on/off (power) switch, a forced reset button, LED indicator lights, display screen (e.g., LED and/or LCD), siren, at least one cooling fan, and/or the like. Such a manual on/off (power) switch, forced reset button, LED indicator lights, display screen, and/or such a siren may be at least partially located on the outer covering (i.e., external surface) of the at least one carrier (e.g., 102). Such elements may be recessed and/or located behind protection from the at least one deflector (e.g., 106). Such a manual on/off (power) switch, a forced reset button, LED indicator lights, display screen (e.g., LED and/or LCD), siren, and/or the at least one cooling fan may be electrically powered by at least one power source 906.

In some embodiments, the at least one carrier (e.g., 104) may further comprise one or more of: the least one camera (e.g., camera 512), at least one speaker 910, at least one positional sensor 918, and/or at least one microphone.

In some embodiments, the at least one camera (e.g., camera 512) may record and/or observe camera field of view 514 that may be of substantially all of major surface 714 of the at least one screen (e.g., 510). Such camera(s) may facilitate one or more of: the shooter scoring analysis by recording impacts from firearm 9004 upon major surface 714 and/or remote viewing of the major surface 714 upon the or more display devices. See e.g., FIG. 9 and FIG. 5.

In some embodiments, at least one speaker 910 may be in electrical and/or optical communication with at least one processor 902. In some embodiments, at least one speaker 910 may emit audio from at least one audio file and/or from the media content. In some embodiments, the media content may comprise at least one visual file and the least one audio file. In some embodiments, the at least one visual file and the at least one audio file may be a combined file comprising both visual and audio information. In some embodiments, the least one visual file may comprise the one or more images. In some embodiments, at least one speaker 910 may receive electrical power from at least one power source 906.

In some embodiments, at least one positional sensor 918 may be in electrical and/or optical communication with at least one processor 902. In some embodiments, at least one positional sensor 918 may provide input signals to at least one processor 902 such that at least one processor 902 may then determine a position of the at least one carrier (e.g., 102) with respect to at least one pathway 112 (or substrate 9008). In some embodiments, at least one positional sensor 918 may receive electrical power from at least one power source 906. In some embodiments, at least one positional sensor 918 may be selected from one or more of: a rotary encoder (e.g., incremental, absolute, magnetic, or optical) and/or an optical positional sensor. For example, and without limiting the scope of the present invention, such a rotary encoder may track motor shaft rotation to generate digital position and/or motion information as input signals to at least one processor 902 or to an internal signal processor of the rotary encoder. The motor shaft may a motor shaft of a motor associated with mover 914. In some embodiments, such a rotary encoder (i.e., at least one positional sensor 918) and mover 914 may be in communication. See e.g., FIG. 9. In some embodiments, position of the given carrier (e.g., 102) may also be determined and/or augmented by a GPS module or the like; wherein such a GPS module may be component of at least one network module 908 and/or of a subset of at least some of the programmable code non-transitorily stored in at least one memory 904 and executed by at least one processor 902.

Figure 10:
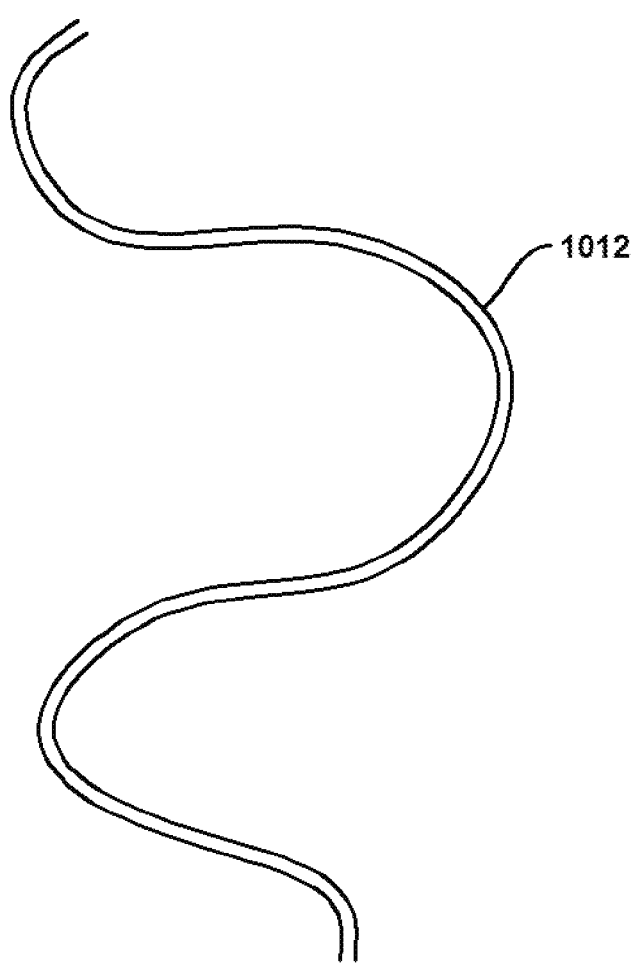
FIG. 10 may depict a variable pathway, showing that the variable pathway may vary in one or more of a sinuous pathway or asymmetrically along the variable pathway's length, as viewed from above and/or as viewed from a side.

In some embodiments, at least one pathway 112 may proceed in a substantially linear fashion for a set overall length. FIG. 10 may depict variable pathway 1012, showing that variable pathway 1012 may vary in one or more of a sinuous pathway or asymmetrically along the variable pathway's 1012 length, as viewed from above and/or as viewed from a side. In some embodiments, at least one pathway 112 may comprise variable pathway 1012.

In some embodiments, variable pathway 1012 may vary within predetermined limits of one or more of: a x-axis direction, a y-axis direction, a z-axis direction, or combinations thereof, with respect to a predetermined shooting location 9010. That is, in some embodiments, variable pathway 1012 may vary within predetermined limits of one or more of: left-right horizontal directions (i.e., lateral movement with respect to predetermined shooting location 9010), forwards-backwards horizontal directions, and/or up-down vertical directions—all with respect to predetermined shooting location 9010. In some embodiments, variable pathway 1012 may comprise at least one curve with a set radius for each such at least one curve and an overall set length.

Herein any references to "about" with respect to any units, measurements, and/or dimensions, unless otherwise explicitly stated, shall mean plus or minus 10% of the given unit noted.

Systems for improving shooting performance, as well as, carriers configured for that purpose, have been disclosed and described herein. Additionally, various targets and their structures, functions, and properties have been disclosed and described herein. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for improving shooting performance, wherein the system comprises:
    at least one projector for projecting one or more images upon at least some portion of at least one screen;
    the at least one screen for displaying the one or more images;
    at least one carrier; wherein the at least one carrier houses the at least one projector;
    at least one pathway; wherein the at least one carrier travels along the at least one pathway;
    wherein a shooter aims and shoots a firearm at the one or more images displayed upon the at least one screen.

2. The system according to claim 1, wherein the one or more images are one or more of static images or dynamic images.

3. The system according to claim 1, wherein the one or more images are predetermined.

4. The system according to claim 1, wherein the one or more images are one or more of non-transitorily stored in at least one memory or generated from an image generator.

5. The system according to claim 1, wherein the at least one screen is a planar member with a major surface for displaying the one or more images; wherein the major surface is substantially planar.

6. The system according to claim 5, wherein the major surface is one or more of substantially flat or curved with a predetermined radius.

7. The system according to claim 5, wherein a two dimensional projection of the major surface, in a direction orthogonal from the major surface, is selected from the group consisting of: a regular polygon, an irregular polygon, a circle, an ellipse, a semicircle, or a half ellipse.

8. The system according to claim 1, wherein the at least one carrier comprises at least one screen mount; wherein the at least one screen mount attaches to the at least one screen, such that the at least one projector and the at least one screen are a predetermined distance from each other.

9. The system according to claim 8, wherein the at least one screen mount is electrically powerable to articulate the at least one screen with respect to the at least one carrier such that the at least one screen is articulable by one or more of: pivoting about where the least one screen mount attaches to the at least one screen or rotating about an axis running from the at least one screen to the at least one screen mount.

10. The system according to claim 1, wherein the system comprises a second carrier that is a screen carrier; wherein the at least one carrier is a projector carrier; wherein the projector carrier houses the at least one projector and the screen carrier comprises at least one screen mount; wherein the at least one screen mount attaches to the at least one screen, such that the at least one projector and the at least one screen are at variable distances from each other.

11. The system according to claim 1, wherein the system comprises at least one camera, wherein the at least one camera observes a camera field of view that is of substantially all of a major surface of the at least one screen; wherein the camera facilitates one or more of: shooter scoring analysis by recording impacts from the firearm upon the major surface or remote viewing of the major surface upon a display device.

12. The system according to claim 1, wherein the at least one carrier comprises:
    at least one processor for reading and implementing programmable code; wherein the programmable code is non-transitorily stored in at least one memory; wherein the programmable code is for one or more of: controlling a position of the at least one carrier with respect to the at least one pathway or controlling media content emitted from the at least one carrier;
    the at least one memory in electrical or optical communication with the at least one processor; wherein the at least one memory non-transitory stores one or more of: the programmable code or the media content;
    at least one communication component; wherein the at least one communication component comprises one or more of: at least one communication port or at least one network module; wherein the at least one communication component is in electrical or optical communication with the at least one processor;
    the at least one projector or both the at least one projector and the at least one screen mount; wherein the at least one screen mount attaches to the at least one screen;
    translation mechanics; wherein the translation mechanics comprises either a mover or the mover with an engagor or the engagor with a track mover; wherein the translation mechanics facilitate movement of the at least one carrier along the at least one pathway; and
    at least one power source; wherein the at least one power source provides electrical power to one or more of: the at least one processor, the at least one memory, the at least one projector, the at least one screen mount, the at least one communication component, or the least one translation mechanics.

13. The system according to claim 12, wherein the at least one carrier further comprises one or more of:
    at least one camera; wherein the at least one camera or observes a camera field of view that is of substantially all of a major surface of the at least one screen; wherein the camera facilitates one or more of: shooter scoring analysis by recording impacts from the firearm upon the major surface or remote viewing of the major surface upon a display device;

at least one speaker; wherein the at least one speaker is in electrical or optical communication with the at least one processor; wherein the at least one speaker emits audio from audio files; wherein the media content comprises visual files and audio files; wherein the at least one speaker receives electrical power from the at least one power source; and at least one positional sensor; wherein the at least one positional sensor is in electrical or optical communication with the at least one processor and provides input signals to the at least one processor for the at least one processor to determine the position of the at least one carrier with respect to the at least one pathway; wherein the at least one positional sensor receives electrical power from the at least one power source.

14. The system according to claim 12, wherein the at least one power sources comprises one or more of: at least one battery or electrical coupling to a shoe, wherein the shoe is electrically coupled to at least some portion of the at least one pathway; wherein this at least some portion of the at least one pathway is electrically charged.

15. The system according to claim 12, wherein the at least one network module comprises at least one antenna for wireless communications with one or more of: a computing device, a mobile computing device, a smartphone, a tablet computing device, a server, a laptop, a desktop computer, a NFC tag, or a RFID tag.

16. The system according to claim 12, wherein mover comprises one or more of: one or more electrical motors, a transmission, one or more gears, one or more belts, one or more axles, one or more wheels; wherein at least a portion of the mover physically engages a substrate, a track, a rail, or the engagor; wherein the mover causes the at least one carrier to translate along the at least one pathway.

17. The system according to claim 12, wherein the engagor physically engages one or more of a rail, a track, a chain, a cable, such that the at least one carrier translates along the rail or along the track or along the chain or along the cable; wherein the at least one pathway comprises the rail, the track, the chain, or the cable.

18. The system according to claim 12, wherein the track mover causes a track to translate; wherein the engagor physically engages the track; wherein the at least one pathway comprises the track.

19. The system according to claim 1, wherein the at least one pathway is at least one elongate member that comprises one or more of: a track, a rail, a chain, a cable, a belt, or a substrate.

20. The system according to claim 1, wherein the at least one pathway varies within predetermined limits of one or more of: a x-axis direction, a y-axis direction, a z-axis direction, or combinations thereof, with respect to a predetermined shooting location.

* * * * *